United States Patent
Danieli et al.

(10) Patent No.: US 8,621,585 B2
(45) Date of Patent: Dec. 31, 2013

(54) INVITATION SERVICE FOR MULTI-DEVICE APPLICATION SESSIONS

(75) Inventors: Damon Danieli, Bellevue, WA (US); Josh Gruenberg, Seattle, WA (US)

(73) Assignee: Z2Live, Inc., Seattle, WA (US)

( * ) Notice: Subject to any disclaimer, the term of this patent is extended or adjusted under 35 U.S.C. 154(b) by 509 days.

(21) Appl. No.: 12/816,282

(22) Filed: Jun. 15, 2010

(65) Prior Publication Data

US 2010/0319062 A1 Dec. 16, 2010

Related U.S. Application Data

(60) Provisional application No. 61/187,615, filed on Jun. 16, 2009.

(51) Int. Cl.
*H04L 29/06* (2006.01)

(52) U.S. Cl.
USPC .................. 726/7; 726/21; 726/26; 713/150; 713/168

(58) Field of Classification Search
USPC ...................... 726/7; 717/176; 709/206, 205
See application file for complete search history.

(56) References Cited

U.S. PATENT DOCUMENTS

| | | | |
|---|---|---|---|
| 7,311,608 B1 * | 12/2007 | Danieli et al. ................... | 463/42 |
| 2002/0065097 A1 * | 5/2002 | Brockenbrough et al. ... | 455/552 |
| 2002/0073163 A1 * | 6/2002 | Churchill et al. .............. | 709/214 |
| 2003/0177184 A1 * | 9/2003 | Dickerman et al. .......... | 709/204 |
| 2004/0148333 A1 * | 7/2004 | Manion et al. ................ | 709/201 |
| 2004/0186889 A1 * | 9/2004 | Washburn ...................... | 709/206 |
| 2005/0245317 A1 * | 11/2005 | Arthur et al. .................... | 463/42 |
| 2006/0178216 A1 * | 8/2006 | Shea et al. ....................... | 463/42 |
| 2006/0239212 A1 * | 10/2006 | Pirzada et al. ................. | 370/260 |
| 2008/0113789 A1 * | 5/2008 | Canessa et al. ................. | 463/29 |
| 2008/0132215 A1 * | 6/2008 | Soderstrom et al. .......... | 455/416 |
| 2008/0147811 A1 * | 6/2008 | Schroeder et al. ............ | 709/206 |
| 2009/0069038 A1 * | 3/2009 | Olague et al. ................. | 455/466 |

\* cited by examiner

*Primary Examiner* — Yogesh Paliwal

(74) *Attorney, Agent, or Firm* — Æ ON Law; Adam L. K. Philipp

(57) ABSTRACT

Methods and apparatuses for handling an invitation to a multi-device networked-application session are disclosed. In one such method, a client device receives a pushed invitation notification from an invitation server. The pushed invitation notification indicates that an inviter user has invited an invitee user to join a multi-device session of a networked application, but the pushed invitation notification omits an invitation payload to enable the invitee user to join the multi-device session. The client device notifies the user of the client device, and the user indicates to accept the invitation. The client device responds to the invitation server, authenticates the user, and receives from the invitation server an invitation payload, according to which the client device attempts to join the multi-device session.

36 Claims, 12 Drawing Sheets

INVITATION SERVICE FOR MULTI-DEVICE APPLICATION SESSIONS

CROSS REFERENCE TO RELATED APPLICATIONS

This application claims the benefit of priority to Provisional Application No. 61/187,615, filed Jun. 16, 2009, titled "Invite Service for Multi-Party Applications on Mobile Devices," and naming inventor Damon V. Danieli. The above-cited application is incorporated herein by reference in its entirety, for all purposes.

FIELD

The present disclosure relates to networked computing, and, more particularly, to systems and methods for handling invitations to multi-device networked application sessions.

BACKGROUND

For decades, users have collaborated in substantially real time via multi-user, multi-device application sessions. Multiplayer game sessions between two (or more) users on two (or more) devices, communicating via a network, are one common example.

Various facilities are known for connecting two users on distant devices to a common multi-device application session. However, many known facilities were developed for personal computer ("PC") or game console gaming ecosystems and may not be suitable for newer computing platforms, such as mobile phones, computing devices embedded in televisions or set top boxes, and the like.

For example, Multiplayer Matchmaking facilities may allow a PC or game console user to connect to other PC or game console users playing the same game. Typically, the game will connect to a "matchmaking" service that stores a list of currently available game sessions. The user can view the game information such as map type, number of players in the session, and other game-specific parameters in this session list and select a session to join. The game would then connect to the server hosting the game session and the user can play with others in that session.

However, standard Multiplayer Matchmaking facilities may be unsuitable in "long tail" environments having a very great number of potential multi-device applications, many of which may have relatively few concurrent users at a given time.

For example, compared to PCs and game consoles, a mobile device such as an iPhone (or iPod Touch, iPad, or the like, all provided by Apple Inc. of Cupertino Calif.), tends to have simpler games and a lot more of them. The iPhone ecosystem includes many tens of thousands of game applications, leading to a very long tail of few users per game for almost all games (save a few very popular ones). Consequently, a list of all "sessions" currently available for any particular game would usually be empty, leading to a poor matchmaking experience. Furthermore, unlike many PCs that can act as their own game servers, many mobile devices such as the iPhone do not remain on and persistently connected to a network when the user is not using it. As a result, a mobile device such as an iPhone cannot typically host its own game server to supply a meeting ground for other players to join.

Moreover, because of the large number of applications and small number of users using each application, it may be economically unviable for many iPhone developers to maintain their own dedicated game servers to host multiplayer game sessions to join.

In addition, game console services such as Xbox Live, provided by Microsoft Corporation of Redmond Wash., host a notification system enabling one game console user to invite another game console user to play a game together. If the invitee game console user is signed-in to Xbox Live, his or her game console will periodically poll the Xbox Live service to determine whether he or she has any pending invitations.

Polling for invitations when a console user is signed-in may provide an acceptable user experience in a special-purpose gaming device (such as a gaming console) having a centralized, platform-provided, single-sign-on invitation system. However, non-gaming-specific computing platforms, such as mobile phones, computing devices embedded in televisions or set top boxes, and the like, may not offer a centralized single sign-on that authenticates the current user across multiple applications. Consequently, a remote invitation service may be unable to determine the identity of the user currently operating a given device at a given point in time. Moreover, repeatedly polling a remote service to check for pending invitations may adversely affect a mobile device's battery life.

Some device platform providers may provide a centralized, general purpose "Push" notification system. For example, various versions of the iOS mobile operating system, provided by Apple Inc. of Cupertino Calif., enable "Push Notifications" in which an application on the sender's device (e.g., an iPhone, iPod Touch, iPad, and the like) can send a notification to the receiver's device through the Apple Push Notification Service ("APNS"). The notification may (or may not) subsequently appear on the receiver's device. The receiver can typically dismiss the notification or accept the notification, which will launch the application with data stored in the message.

The APNS works only if both sender and receiver have installed the application in question, and if both users have run the application, and if the receiver's application has uploaded a "Push Token" to the server of the Push Notification Provider. Once the Push Token is uploaded to the APNS server. Once all of these conditions have been met, an application on another device can send an invite to the device that generated that Push Token.

However, standard Push Notifications provided by APNS may not be suitable for invitations to multi-device applications sessions because, inter alfa, APNS is a "best effort" system, meaning that a Push Notification is not guaranteed to be delivered. Therefore, if the sender wanted to send state in an invitation (for example, an opening chess move or poker bet), some additional persistence must be provided, otherwise the initial game state may be invalid if the logic of the application demands reliable delivery of messages. In addition, a Push Notification can convey only a limited amount of data, which may be insufficient to adequately convey state to the receiver.

DESCRIPTION

Figure 1:
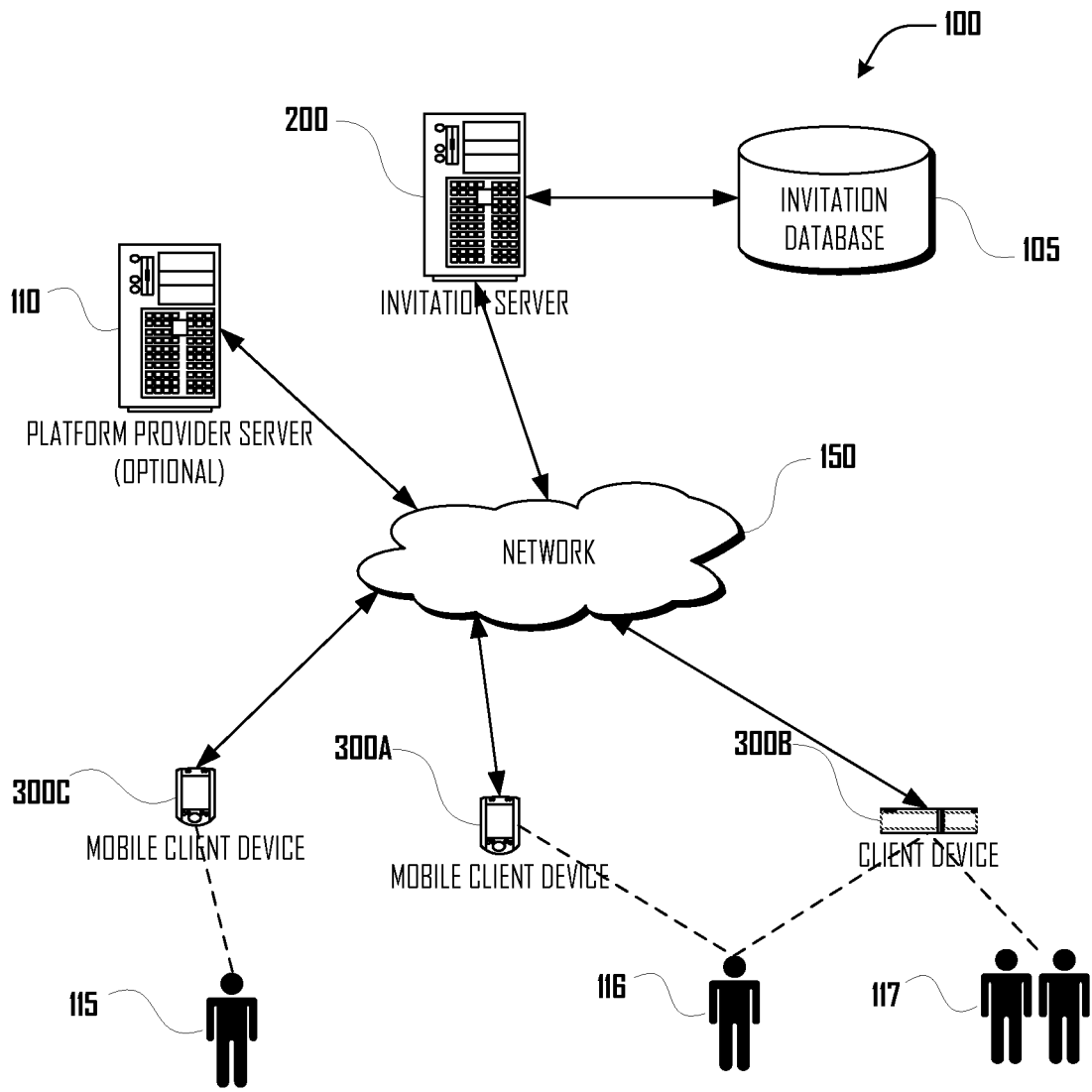
FIG. 1 is a system diagram showing a number of interconnected devices in accordance with one embodiment.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file servers, computer servers, and/or memory storage devices. Each of these conventional distributed computing components is accessible by the processor via a communication network.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates an exemplary invitation system 100 in which client devices 300A-C and an Invitation Server 200 are connected to a network 150. Each of client devices is used by (or otherwise associated with) one or more users 115-117. In various embodiments, users may be associated with devices in one-to-many, one-to-one, many-to-one, and/or many-to-many relationships.

In various embodiments and as discussed at length below, Invitation Server 200 facilitates joining two or more of devices 300A-C (and, by extension, two or more of users 115-117) in a multi-device application session. As the term is used herein, a "multi-device application session" refers to a series of contemporaneous interactions involving at least two users of at least two devices (often, but not always physically remote from one another) via a series of networked communications between an instance of an application on a first device (operated by a first user) and an instance of the application on a second device (operated by a second user). For example, in various embodiments, a multi-device application session may comprise a multiplayer game, such as card games, "shooter" games, fighting or combat games, and the like; a multi-user interactive text, audio, and/or video conference session; a multi-user productivity application session; a virtual-reality interactive session; and the like. The subject application is also variously referred to as being "invitation-enabled," meaning that the application is configured to implement appropriate portions of the invitation-handling routines and/or protocols disclosed herein.

In some embodiments, other servers and/or devices (not shown) may also be present. For example, in some embodiments, platform provider server 110 may be present, working in concert with Invitation Server 200 to push notifications out to some or all of client devices 300A-C. In other embodiments, Invitation Server 200 may be able to push notifications to client devices 300A-C on its own. In some embodiments, one or more mobile data provider servers (not shown) may also be present.

Invitation Server 200 is also connected to Invitation Database 105. In various embodiments, Invitation Database 105 may store persistent data such as Users, Profiles, Invites, Game Sessions, and the like. In some embodiments, Invitation Server 200 may communicate with Invitation Database 105 via network 150, a storage area network ("SAN"), a high speed serial bus, and/or via other suitable communication technology.

In some embodiments, Invitation Server 200 and/or Invitation Database 105 may comprise one or more replicated and/or distributed physical or logical devices. For example, in one embodiment, Invitation Server 200 may comprise a push notification server (not shown) that may communicate with platform provider server 110 (if present) to issue Push Notifications to certain types of client device.

In various embodiments, network 150 may include the Internet, a local area network ("LAN"), a wide area network ("WAN"), a cellular data network, and/or other data network. In many embodiments, there may be more client devices 300 than are illustrated.

Figure 2:
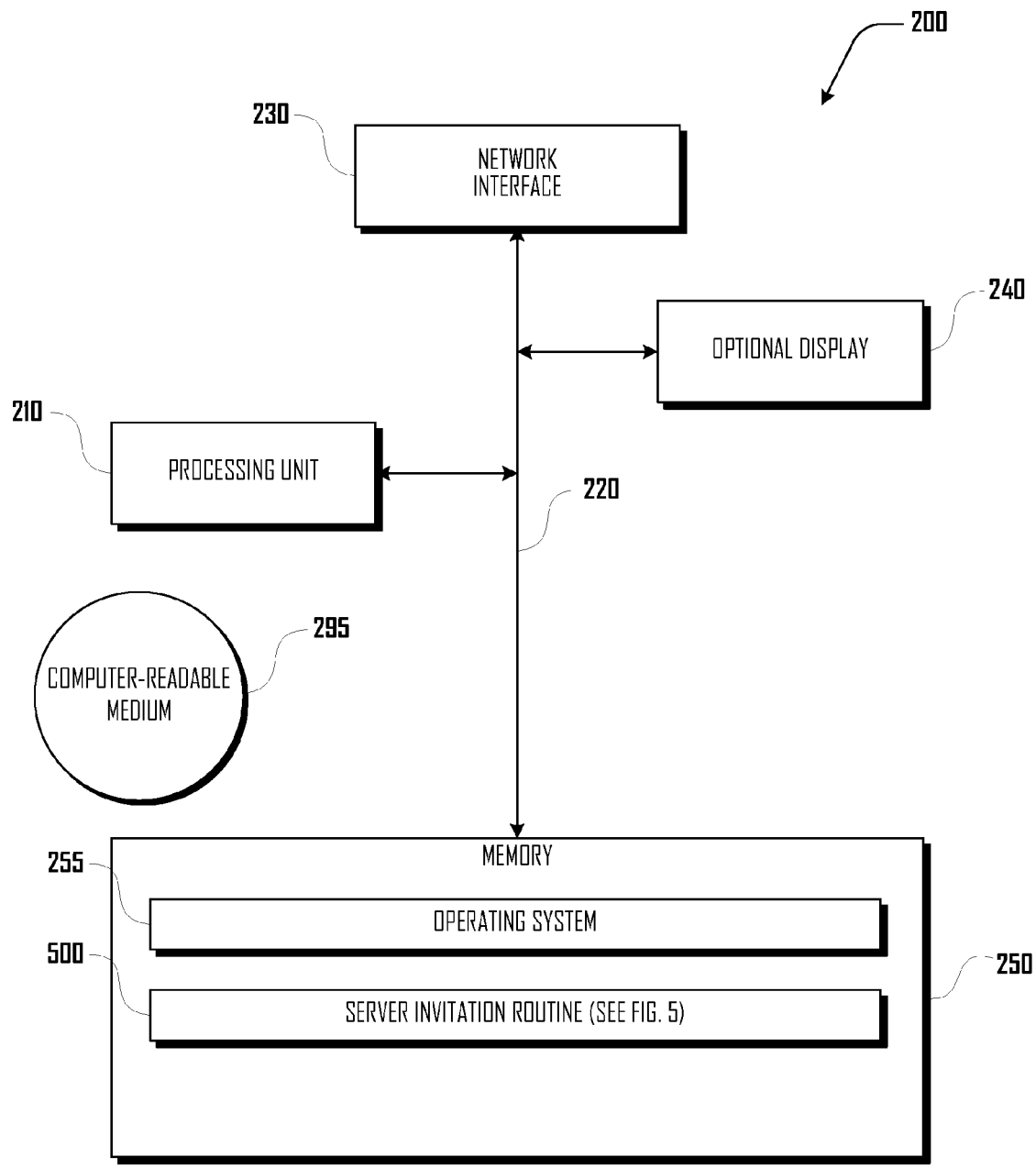
FIG. 2 illustrates several components of an exemplary Invitation Server in accordance with one embodiment.

FIG. 2 illustrates several components of an exemplary Invitation Server 200. In some embodiments, Invitation Server 200 may include many more components than those shown in FIG. 2. However, it is not necessary that all of these generally conventional components be shown in order to disclose an illustrative embodiment. As shown in FIG. 2, Invitation Server 200 includes a network interface 230 for connecting to the network 150.

The Invitation Server 200 also includes a processing unit 210, a memory 250, and an optional display 240, all interconnected along with the network interface 230 via a bus 220. The memory 250 generally comprises a random access memory ("RAM"), a read only memory ("ROM"), and a permanent mass storage device, such as a disk drive. The memory 250 stores program code for an invitation processing routine 500 (see FIG. 5, discussed below). In addition, the memory 250 also stores an operating system 255. These software components may be loaded from a computer readable storage medium 295 into memory 250 of the Invitation Server 200 using a drive mechanism (not shown) associated with a non-transient computer readable storage medium 295, such as a floppy disc, tape, DVD/CD-ROM drive, memory card, or the like. In some embodiments, software components may also be loaded via the network interface 230, rather than via a computer readable storage medium 295.

Invitation Server 200 also communicates via bus 220 with Invitation Database 105. In various embodiments, bus 220 may comprise a storage area network ("SAN"), a high speed serial bus, and/or via other suitable communication technology. In some embodiments, Invitation Server 200 may communicate with Invitation Database 105 via network interface 230.

Although an exemplary Invitation Server 200 has been described that generally conforms to conventional general purpose computing devices, an Invitation Server 200 may be any of a great number of devices capable of communicating with the network 150 and/or Client Devices 300, for example, a personal computer, a game console, a set-top box, a handheld computer, a cell phone, or any other suitable device.

Figure 3:
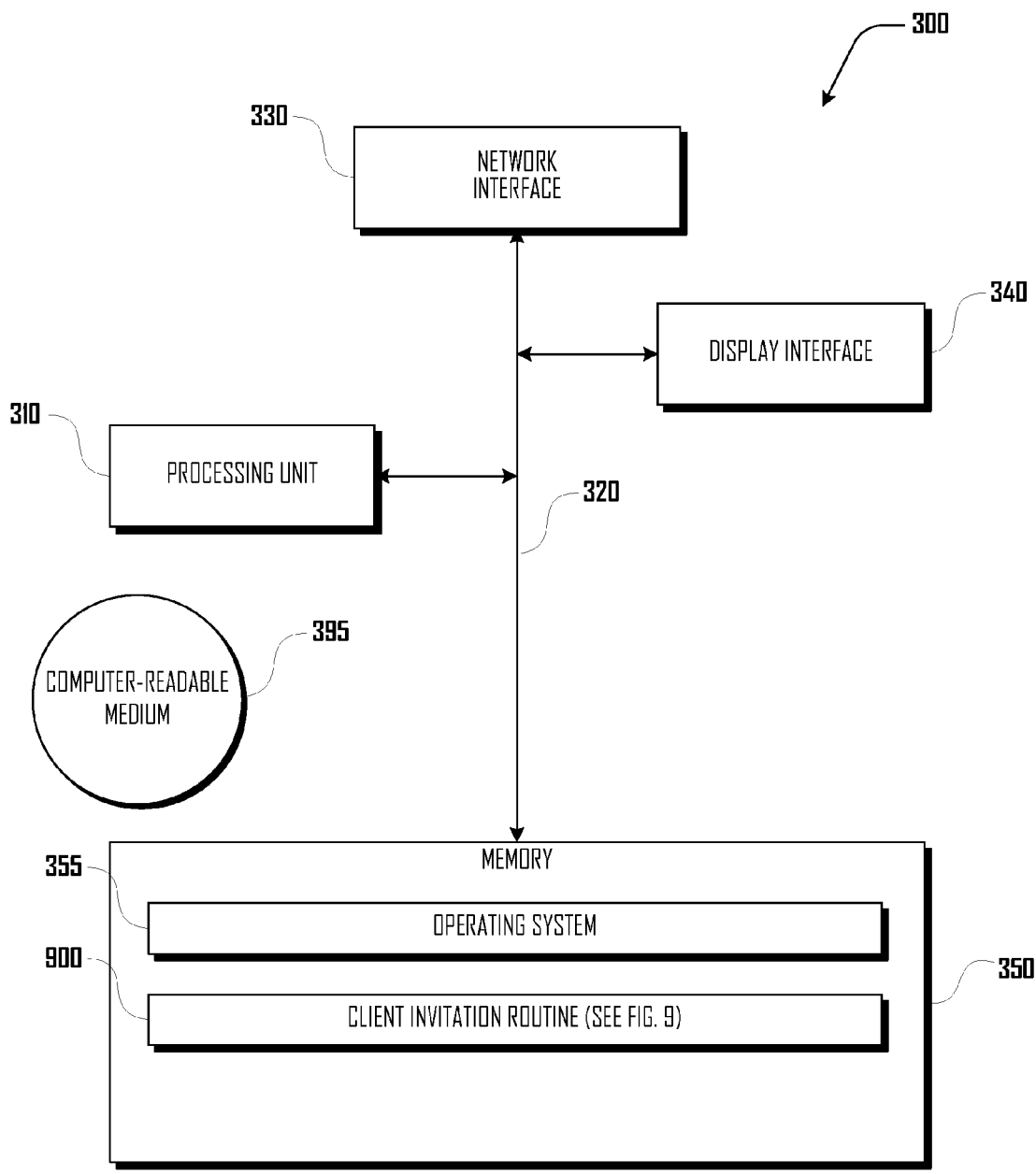
FIG. 3 illustrates several components of an exemplary Client Device in accordance with one embodiment.

FIG. 3 illustrates several components of an exemplary Client Device 300. In some embodiments, Client Device 300 may include many more components than those shown in FIG. 3. However, it is not necessary that all of these generally conventional components be shown in order to disclose an illustrative embodiment. As shown in FIG. 3, the Client Device 300 includes a network interface 330 for connecting to the network 150.

The Client Device 300 also includes a processing unit 310, a memory 350, and a display interface 340, all interconnected along with the network interface 330 via a bus 320. The memory 350 generally comprises a random access memory ("RAM"), a read only memory ("ROM"), and a permanent mass storage device, such as a disk drive, flash device, or the like. The memory 350 stores program code for invitation processing routine 900 (see FIG. 9, discussed below). In addition, the memory 350 also stores an operating system 355. These software components may be loaded from a computer readable storage medium 395 into memory 350 of the Client Device 300 using a read mechanism (not shown) associated with a non-transient computer readable storage medium 395, such as a floppy disc, tape, DVD/CD-ROM drive, memory card, or the like. In some embodiments, software components may also be loaded via the network interface 330, rather than via a computer readable storage medium 395.

Although an exemplary Client Device 300 has been described that generally conforms to conventional general purpose computing devices, a Client Device 300 may be any of a great number of devices capable of communicating with the network 150 and executing multi-device applications, for example, a personal computer, a game console, a set-top box, a handheld computer, a cell phone, or any other suitable device.

Figure 4:
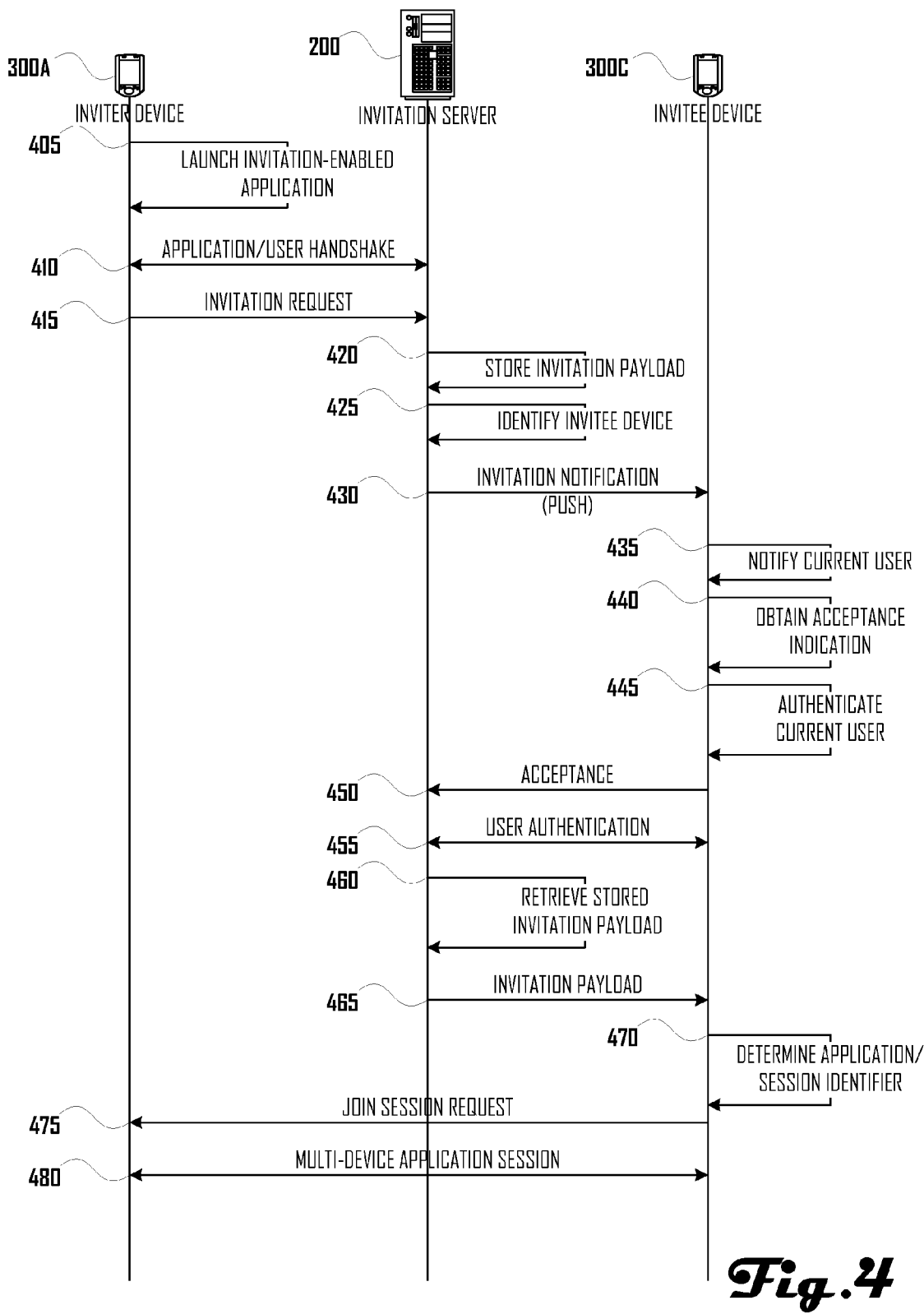
FIG. 4 illustrates an exemplary series of communications between Client Devices and an Invitation Server, in accordance with one embodiment.

FIG. 4 illustrates an exemplary series of communications between Inviter Device 300A, Invitation Server 200, and Invitee Device 300C, in accordance with one embodiment. The illustrated series of communications shows an exemplary scenario in which a user on Inviter Device 300A invites a user on Invitee Device 300C to participate in a multi-device application session via an invitation-enabled application. In the illustrated scenario, both devices 300A and 300C have the invitation-enabled application already installed. (In other scenarios, the Invitee Device 300C may not initially have the invitation-enabled application installed.)

Beginning the illustrated sequence of operations, the inviter user of Inviter Device 300A launches 405 the invitation-enabled application, which exchanges various "handshake" 410 communications with Invitation Server 200. For example, in some embodiments, the invitation-enabled application may authenticate itself with Invitation Server 200; the inviter user may authenticate him- or her-self and/or sign-in with Invitation Server 200; application identifiers and/or keys may be exchanged; a device identifier (possibly a unique device identifier or "UDID") may be provided; and the like. (See FIG. 6, discussed below.)

Once the invitation-enabled application is launched and all "handshake" operations completed, the user may direct the invitation-enabled application to send an invitation request 415 to Invitation Server 200.

For example, the invitation-enabled application may present the user with an option such as "Play with a Friend," if the invitation-enabled application is a game, after which the user may select another user (possibly from a list of the user's "friends"), triggering the invitation-enabled application to send an invitation request 415 to Invitation Server 200. In some embodiments, the user may select more than one "friend," or the user may have the option to automatically invite a group or all of his or her friends.

In one embodiment, an invitation request 415 may include some or all of the following parameters or attributes:

- an identifier (e.g., a Universally Unique Identifier or "UUID" and/or a Globally Unique Identifier or "GUID") of the user making the request (the inviter user);
- an identifier (e.g., a UUID/GUID) of a user to be invited (the invitee user);
- an identifier (e.g., a Uniform Resource Identifier or "URI") for the multi-device application session for the invitee user to join;
- a message to be shown to the recipient;
- an identifier of a sound resource to be played when the invitee client device is notified of the pending invitation;
- a start time, expiration time, and/or a duration the invitation may remain pending; and
- a notification suppression flag to prevent Invitation Server 200 from pushing an invitation notification to the invitee user.

In addition, in some embodiments, an invitation request 415 may also include application-specific data. For example, if the invited-to application is a game of an appropriate type, the invitation request 415 may include game-specific information such as a specific "map," a specific game type (e.g., death match, cooperative, and the like).

In many embodiments, the identified multi-device application session refers to a particular session of a particular application. However, in some embodiments, the identified multi-device application session may refer to a session of one or more potential applications. For example, a user may wish to invite another user to play any one of a plurality of different games, which may be specifically selected by the user, selected according to genre, or the like. In such embodiments, an invitation request 415 may specify that the invited-to application session may take place in any of the specified applications.

In some embodiments, an invitation request 415 may identify multiple users to be invited. For example, in various embodiments, the invitation request 415 may identify some or all of the inviting user's "friends" or it may identify that the invitation is "open" to any user who may wish to join. In the case of an "open" invitation, the user may receive a subsequent specific invitation when another user accepts the "open" invitation.

In some embodiments, a start time, expiration time, and/or a duration for the invitation may allow the inviter user to specify a time and/or date range for the invitation. For example, in various embodiments, the inviter user may specify an invitation valid for the next hour, between 5 pm-6 pm Friday, after 10 pm on weekdays, and the like.

The Invitation Server 200 generates and stores an "invitation payload" 420 in a data store, for example, in Invitation Database 105. In one embodiment, the persisted invitation payload 420 may include some or all of the parameters or attributes received as part of the invitation request 415, such as identifiers corresponding to the inviter user, the invitee user, and the multi-device application session. The persisted invitation payload 420 corresponds to an invitation identifier that may be used to locate and/or retrieve the persisted invitation payload 420 from the data store. In some embodiments, the invitation identifier may be a UUID and/or GUID generated by the Invitation Server 200. In other embodiments, Inviter Device 300A may generate the invitation identifier and include it with the invitation request 415.

The Invitation Server 200 also identifies 425 a client device (e.g., Invitee Device 300C) associated with the invitee user. (See FIG. 7, discussed below.) In other embodiments, more than one client device may be identified.

Once Invitee Device 300C has been identified, Invitation Server 200 "pushes" an invitation notification 430 to Invitee Device 300C. As used herein, the term "push" in this context refers to a style of network communication where the request for a given transaction is initiated by the publisher or server. (By contrast, in "pull" transactions, the receiver or client initiates the request for the transmission of information by the publisher or server.) In some cases, Invitation Server 200 may act on concert with a distinct push notification server (not shown), which may be operated by a platform provider. For example, to push a notification to a client device running the iOS mobile operating system (e.g., an iPhone, iPod Touch, iPad, and the like), Invitation Server 200 may communicate with a push notification server operated by Apple Inc. of Cupertino Calif., which developed and provides the iOS mobile operating system.

The invitation notification 430 does not include all of the information stored as part of the invitation payload 420, and the invitation notification 430 by itself does not include sufficient information to enable Invitee Device 300C to join the multi-device application session. For example, in many embodiments, the invitation notification 430 may not include the identifier of the multi-device application session for the invitee user to join. However, in many embodiments, the invitation notification 430 may include identifiers corresponding to the persisted invitation payload, the inviter user, the invitee user, and the notification sound (if any), as well as the message to be shown to the recipient.

In some embodiments, the invitation notification 430 may further include information such as a count of pending invitations issued to the invitee user, or other data.

Upon receipt of the invitation notification, Invitee Device 300C notifies 435 whoever is currently using the device that an invitation is available for the invitee user. In some embodiments, some or all of this notification process may be handled by the operating system running on the Invitee Device 300C and/or by software components provided by the platform provider. For example, on iOS mobile client devices (e.g., an iPhone, iPod Touch, iPad, and the like), a standard push notification manager may handle receipt of the invitation notification 430, as well as initial notification of the current user of the device.

Having notified the current device user of a pending invitation, Invitee Device 300C obtains an indication 440 that the current device user wishes to accept the invitation. (See, e.g., FIG. 12, discussed below.) However, in some cases, the current user of the Invitee Device 300C may not be the Invitee User, to whom the invitation was directed. For example, Alice may have invited Barry to join her in a multi-device session in a poker game. In many cases, Invitation Server 200 may be able to identify Barry's mobile device and push an invitation notification to Barry's mobile device. However, in many cases, Invitation Server 200 may be unable to determine that when the invitation notification is received, Barry's child or spouse Casey (and not Barry) may actually currently be using Barry's mobile device.

Consequently, Invitee Device 300C authenticates the current user 445 as the Invitee User on the device before sending the invitation acceptance 450 to Invitation Server 200. The Invitee User is also authenticated 455 between Invitation Server 200 and Invitee Device 300C. For example, Invitee Device 300C may obtain an authentication credential (e.g., a password, PIN, pass phrase, or the like) when authenticating 445 the user on the device, and Invitee Device 300C may in turn provide the authentication credential to Invitation Server 200 to authenticate 455 the user to Invitation Server 200.

Typically, the invitation acceptance 450 includes the invitation identifier, which Invitation Server 200 uses to locate and retrieve the persisted invitation payload 460 corresponding to the accepted invitation. Invitation Server 200 sends the invitation payload 465 to Invitee Device 300C, which determines therefrom the identifier 470 (e.g., a URI) for the multi-device application session to be joined. Using the determined multi-device application session identifier, Invitee Device 300C sends to Inviter Device 300A a request 475 to join the multi-device application session. Inviter Device 300A and Invitee Device 300C then communicate with each other as their respective users participate in the multi-device application session 480.

Figure 5:
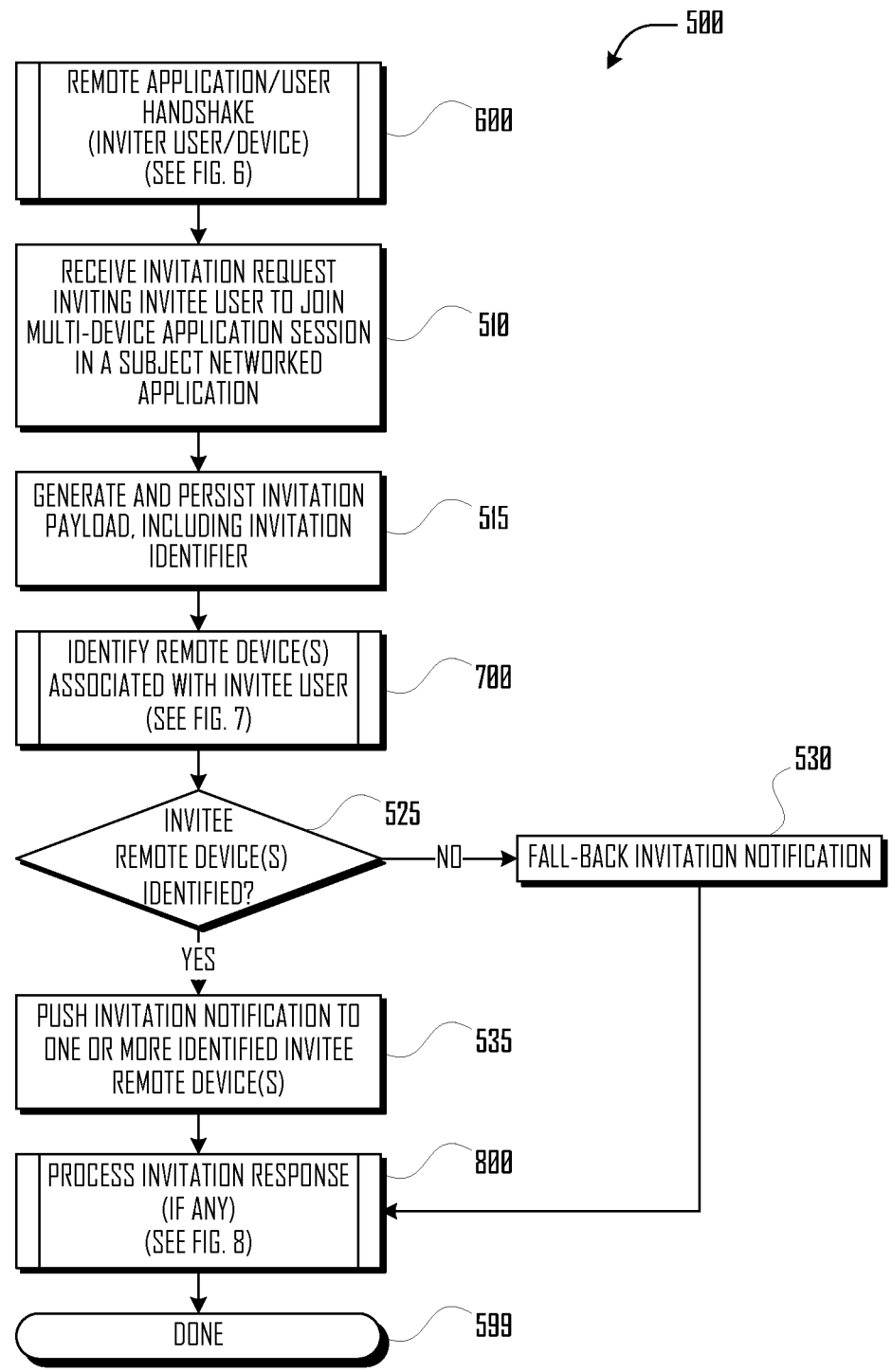
FIG. 5 illustrates invitation server routine in accordance with one embodiment.

FIG. 5 illustrates invitation routine 500, such as may be performed by Invitation Server 200 in accordance with one embodiment. In subroutine block 600, routine 500 performs a handshake process with a remote invitation-enabled application on a remote inviter device. For example, in some embodiments, the invitation-enabled application may authenticate itself with routine 500; an inviter user may authenticate him- or her-self and/or sign-in with routine 500; application identifiers and/or keys may be exchanged; a device identifier (possibly a UDID) may be provided; and the like. (See FIG. 6, discussed below.)

In block 510, routine 500 receives an invitation request from the remote inviter device, the invitation request inviting an invitee user to join an inviter user in a multi-device session of a subject networked and invitation-enabled application. (See discussion of invitation request 415, above.)

In block 515, routine 500 generates and persists an invitation payload in a data store, the invitation payload corresponding to an invitation identifier. (See discussion of invitation payload 420, above.)

In subroutine block 700, routine 500 attempts to identify one or more remote client devices associated with the invitee user. (See FIG. 7, discussed below.) In decision block 525, routine 500 determines whether one or more remote client devices associated with the invitee user were successfully identified. If so, in block 535, routine 500 pushes an invitation notification to the identified one or more remote client devices associated with the invitee user.

In some embodiments, if more than one remote invitee client device is identified, then notifications may be pushed to all of them. In other embodiments, if more than one remote invitee client device is identified, then a subset of the remote invitee client devices may be selected, with notifications pushed to only the selected subset. In such embodiments, one or more selection criteria may be employed to select devices to which notifications will be pushed. For example, in one embodiment, one or more of the most frequently-used remote invitee client devices may be selected. In another embodiment, one or more of the most recently-used remote invitee client devices may be selected. In yet another embodiment, remote invitee client devices may be selected according to their having been used both frequently and recently, in some weighted combination.

In decision block 525, if routine 500 determines that one or more remote client devices associated with the invitee user were not successfully identified, then in block 530, routine 500 attempts to notify the invitee user via a fallback notification mechanism. For example, in various embodiments, routine 500 may attempt to notify the invitee user of the pending invitation via a text message, email, or other means.

In subroutine block 800, routine 500 obtains and processes any responses to the invitation notification that the receiving device or invitee user may send. (See FIG. 8, discussed below.) Routine 500 ends in block 599.

Figure 6:
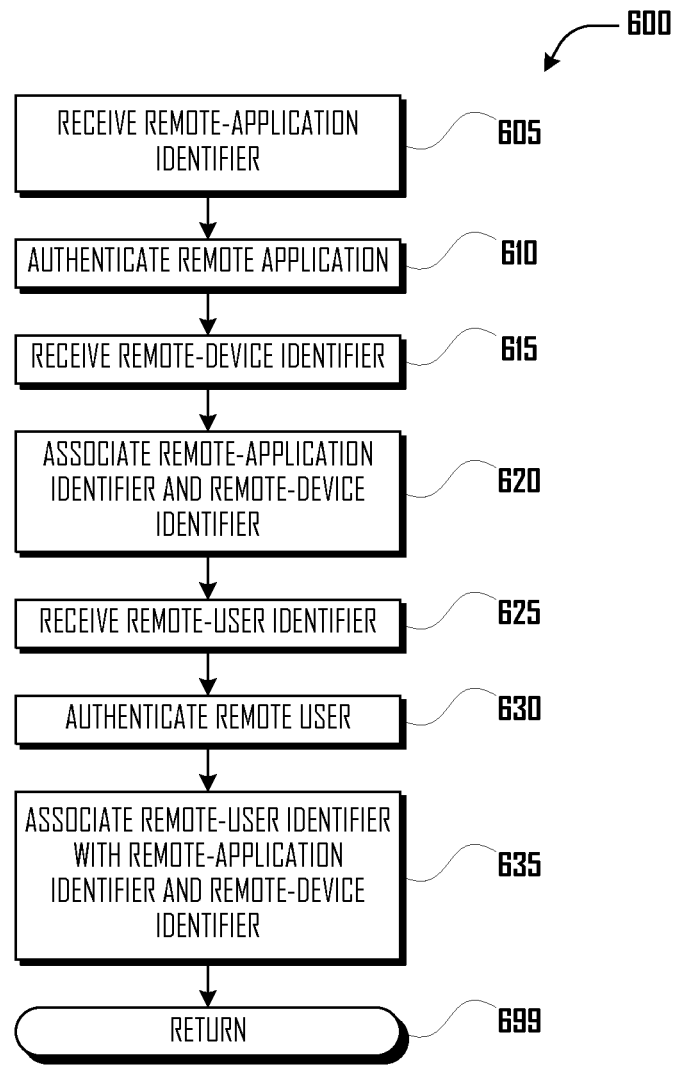
FIG. 6 illustrates a server application/user handshake subroutine in accordance with one embodiment.

FIG. 6 illustrates a server-based application/user handshake subroutine 600, in accordance with one embodiment. In block 605, subroutine 600 receives an identifier corresponding to a remote invitation-enabled application. In block 610, subroutine 600 authenticates the remote application. In block 615, subroutine 600 receives a device identifier from the requesting remote device.

For example, in one embodiment, subroutine 600 may receive an authentication request including a UDID or other identifier corresponding to the requesting remote device. The subroutine 600 may respond with an authentication challenge. For example, in one embodiment, subroutine 600 may utilize a Hypertext Transfer Protocol or "HTTP" basic access authentication mechanism or another suitable authentication mechanism. In one embodiment, the requesting remote device responds to the challenge with an Application ID and Application Key, which may have been previously obtained when its developer registered the remote invitation-enabled application with the invitation service. In one embodiment, subroutine 600 responds to a successful authentication with a token (e.g. a session cookie) that may be utilized in subsequent communications between the requesting remote device and subroutine 600 (and associated routines and subroutines).

In block 620, subroutine 600 associates the identifier corresponding to the remote invitation-enabled application, which was received in block 605, with the requesting remote device identifier, which was received in block 615, for example, by updating records in a relational database (e.g., database 105).

In block 625, subroutine 600 receives an identifier corresponding to the current user of the requesting remote device, and in block 630, subroutine 600 authenticates the current user. For example, in one embodiment, subroutine 600 may obtain a UUID corresponding to the current user and may further authenticate a new user session such as by using an HTTP basic access authentication mechanism, in which the user provides a username and password, or another suitable authentication mechanism. In response to a successful user authentication, subroutine 600 may provide a user-session token that may be utilized in subsequent communications between the requesting remote device and subroutine 600 (and associated routines and subroutines).

In block 635, subroutine 600 associates the identifier corresponding to the current user of the requesting remote device, which was received in block 625, with the identifier corresponding to the remote invitation-enabled application, which was received in block 605. In block 635, subroutine 600 also associates the identifier corresponding to the current user of the requesting remote device with the requesting remote device identifier, which was received in block 615. For example, in one embodiment, subroutine 600 may make such associations by updating records in a relational database (e.g., database 105).

The subroutine 600 ends in block 699.

Figure 7:
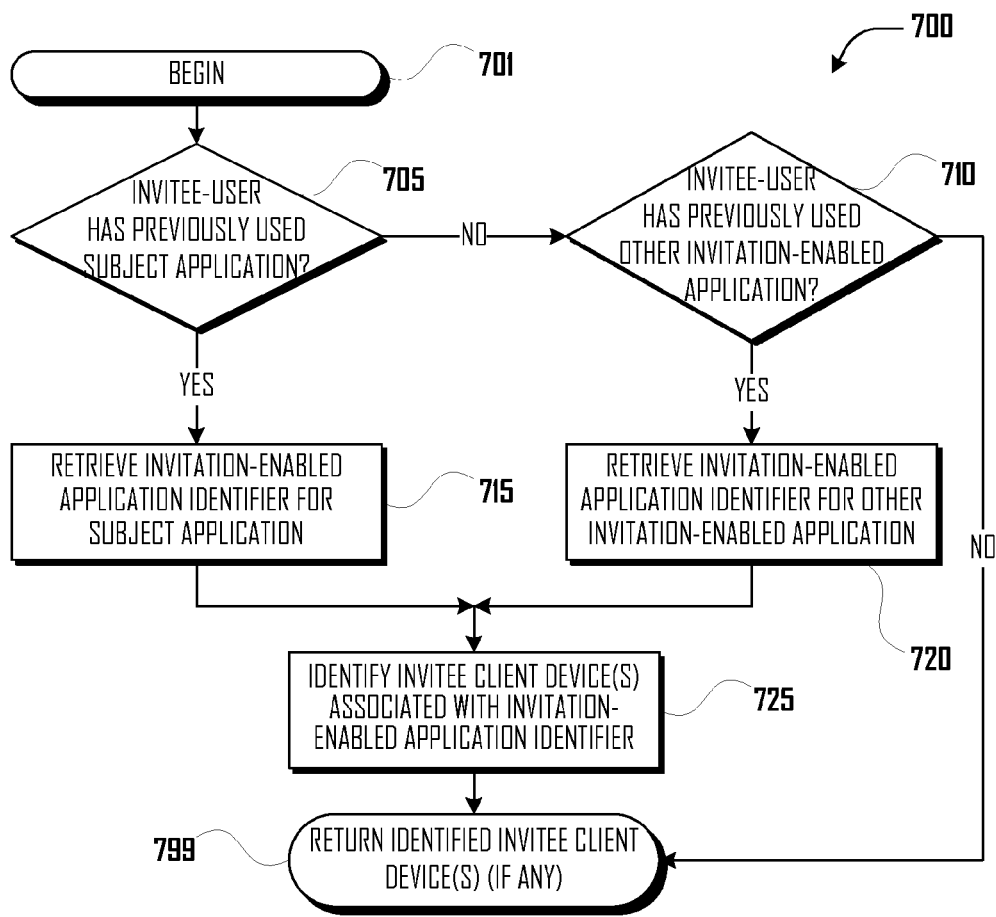
FIG. 7 illustrates a subroutine for identifying one or more remote client devices associated with an invitee user and a subject invitation-enabled application in accordance with one embodiment.

FIG. 7 illustrates a subroutine 700 for identifying one or more remote client devices associated with an invitee user and a subject invitation-enabled application, in accordance with one embodiment. Subroutine 700 begins in block 701, and in decision block 705, subroutine 700 determines whether the invitee user has previously used the subject invitation-enabled application. For example, in one embodiment, subroutine 700 may query a database (e.g., database 105) to determine whether there exists a record associating the user and the subject application. If the invitee user is determined to have previously used the subject invitation-enabled application, then in block 715, subroutine 700 retrieves an application identifier corresponding to the subject invitation-enabled application. (Cf. the application identifier received in block 605, discussed above.)

In decision block 705, if the invitee user is not determined to have previously used the subject invitation-enabled application, then in decision block 710, subroutine 700 determines whether the invitee user has previously used another invitation-enabled application. For example, in one embodiment, subroutine 700 may query a database (e.g., database 105) to determine whether there exists a record associating the user and another invitation-enabled application.

If the invitee user is not determined to have previously used another invitation-enabled application, then no remote client devices associated with the invitee user can be identified. On the other hand, if the invitee user is determined to have previously used another invitation-enabled application, then in block 720, subroutine 700 retrieves an application identifier corresponding to the determined other invitation-enabled application. (Cf. the application identifier received in block 605, discussed above.)

Once a previously-used application identifier has been retrieved (either for the subject invitation-enabled application or for another invitation-enabled application), in block 725, subroutine 700 identifies a remote client device associated with the retrieved previously-used application identifier. For example, in one embodiment, subroutine 700 may query a database (e.g., database 105) to locate one or more records associating the invitee user, the previously-used application identifier, and one or more remote client devices.

In one embodiment, association records such as those discussed above may have been created according to an earlier application/user handshake process, such as that illustrated in FIG. 6, performed when the invitee user previously launched the subject invitation-enabled application on a client device.

Subroutine 700 ends in block 799, returning to the caller any identified remote client devices associated with the invitee user, if any.

Figure 8:
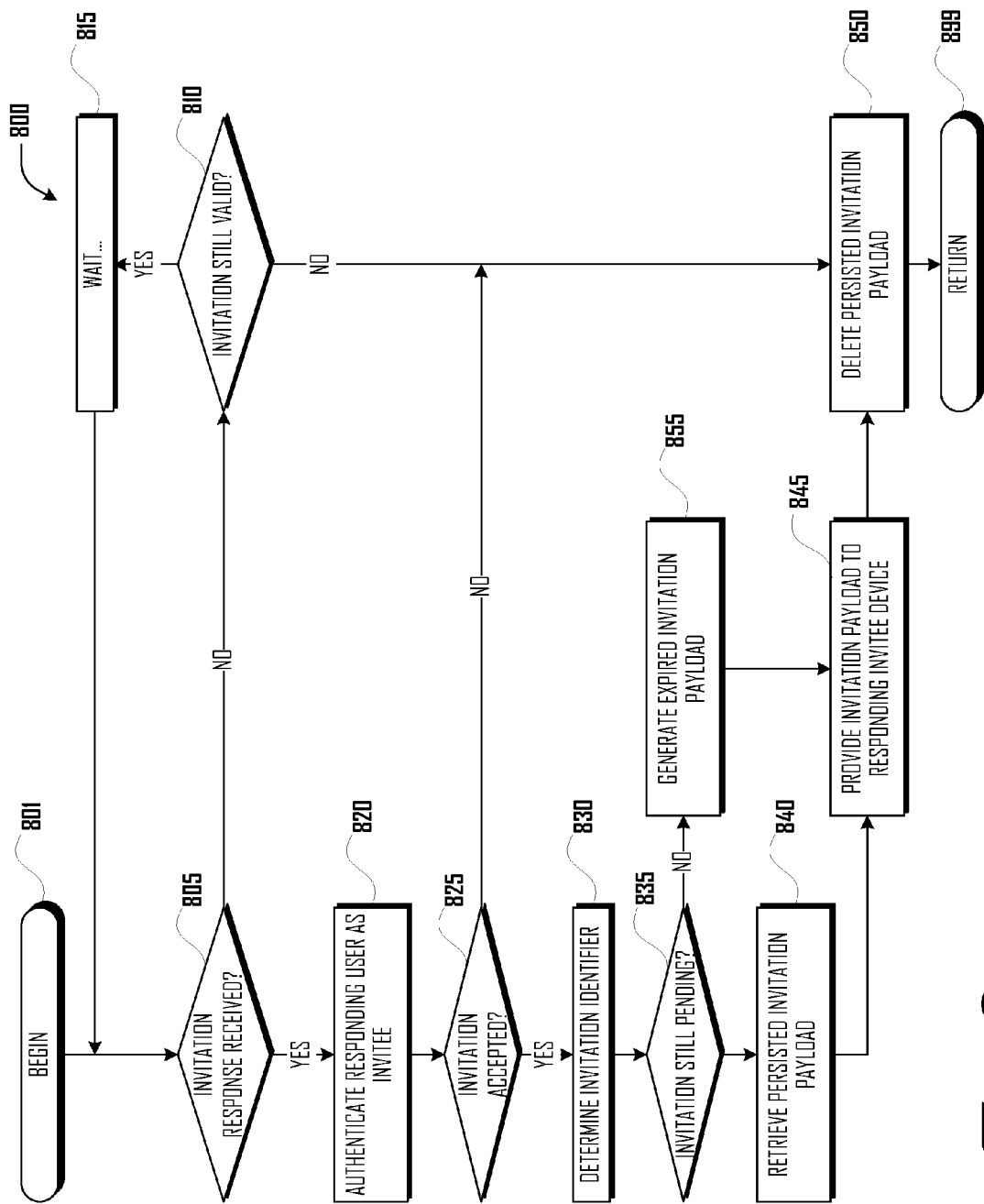
FIG. 8 illustrates a subroutine for processing invitation responses in accordance with one embodiment.

FIG. 8 illustrates a subroutine 800 for processing any invitation responses that may be received, such as by Invitation Server 200, in accordance with one embodiment. Subroutine 800 begins in block 801, and in decision block 805, it determines whether a response corresponding to a pending invitation has been received.

If a response corresponding to a pending invitation is not determined to have been received, then in decision block 810, subroutine 800 determines whether the pending invitation is still valid. For example, subroutine 800 may determine whether an expiration time has passed or whether an invitation duration has been exceeded. If the pending invitation is determined to be no longer valid, subroutine 800 deletes persisted records, including the invitation payload, corresponding to the invitation in block 850. If the pending invitation is determined to be still valid, then in block 815, subroutine 800 enters a wait state before cycling back to decision block 805.

It will be appreciated that the illustrated subroutine 800 (like all routines disclosed herein) is an abstraction, and that an actual response-handling routine or subroutine need not be implemented using the illustrated iterative structure. Indeed, in many embodiments, a response-handling routine may be invoked via a message received by Invitation Server 200. In some embodiments, block 810 may be implemented as a separate routine, for example, a periodic sweep-and-clean operation that prunes expired invitations from the database. Moreover, in most embodiments, a response-handling routine or subroutine would likely deal with numerous co-pending invitations between numerous invitees and numerous inviters. However, it is not necessary that all of these generally conventional implementation details be shown in order to disclose an illustrative embodiment.

In block 805, if a response corresponding to a pending invitation is determined to have been received from a remote client device, then in block 820, the current user of the responding remote client device is authenticated. (See discussion of user authentication in regard to block 630, above.) In some embodiments, some or all of the operations illustrated herein may take place in an order other than the order illustrated. For example, in some embodiments, the responding user may authenticate or sign-in before sending a response accepting the pending invitation.

In block 825, subroutine 800 determines whether the received response indicates that the invitation is accepted or declined. If the invitation is declined, then in block 850, subroutine 800 may delete persisted records, including the invitation payload, corresponding to the declined invitation. In some embodiments, subroutine 800 may additionally perform other operations (not shown), such as notifying the inviter that the invitation has been declined.

If the invitation is accepted, then in block 830, subroutine 800 determines the invitation identifier corresponding to the accepted invitation. In some embodiments, the invitation identifier may be provided by the responding remote client device as a parameter of the invitation response.

In block 835, subroutine 800 determines whether the invitation remains pending. If so, then in block 840, subroutine 800 retrieves the persisted invitation payload corresponding to the invitation identifier (for example, from database 105), the invitation payload including information to enable the responding remote client device to join the invited-to multi-device application session.

If the accepted invitation is no longer pending, then in block 855, subroutine 800 generates an expired invitation payload. In various embodiments, an invitation may be no longer pending because it has timed out, because an expiration time has passed, because the invited-to multi-device application session has terminated, or for other reasons.

The expired invitation payload does not enable the responding remote client device to join the invited-to multi-device application session. Rather, in one embodiment, the expired invitation payload includes information to enable the responding remote client device to "re-invite" the original inviter user to a new multi-device application session. In other embodiments, the expired invitation payload may simply include an indication that the invitation has expired, that the invited-to multi-device application session has terminated, or the like.

In block 845, subroutine 800 provides the persisted or expired invitation payload (as appropriate) to the responding remote client device. Finally, in one embodiment, subroutine 800 deletes the persisted invitation payload from database 105. In some embodiments, this deletion may take place at a later time, or it may take place only if the current responding user is the final responder to a multi-user invitation. Subroutine 800 ends in block 899.

Figure 9:
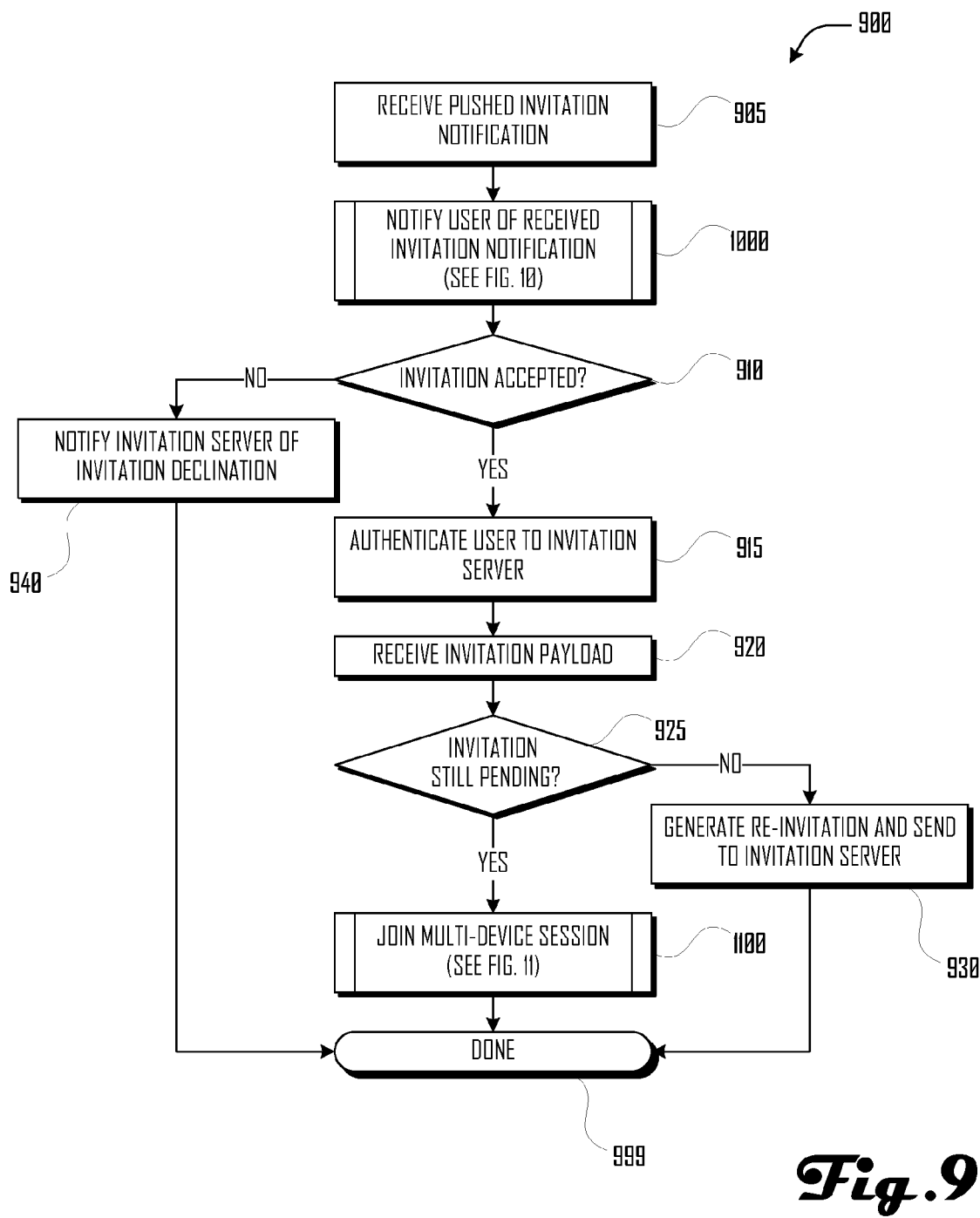
FIG. 9 illustrates an exemplary client device invitation routine in accordance with one embodiment.

FIG. 9 illustrates an exemplary invitation routine 900 such as may be performed by a client device in accordance with one embodiment. In block 905, routine 900 receives a pushed invitation notification sent via Invitation Server 200. In subroutine block 1000, routine 900 notifies the current user of the client device that an invitation notification has been received, signs-in the current device user (if necessary), and obtains an indication of whether the current user wishes to accept or decline the invitation. (See FIG. 10, discussed below.)

In decision block 910, routine 900 determines whether the current user wishes to accept or decline the invitation. If the current user wishes to decline the invitation, then in block 940, routine 900 responds to Invitation Server 200, notifying Invitation Server 200 that the user wishes to decline the invitation.

If, however, the current user wishes to accept the invitation, then in block 915, routine 900 authenticates the current user to Invitation Server 200. For example, in one embodiment, routine 900 may obtain and send a username/password pair to Invitation Server 200.

In block 920, routine 900 receives from Invitation Server 200 an invitation payload corresponding to the accepted invitation. In block 925, routine 900 determines, according to the invitation payload, whether the accepted invitation remains pending. For example, in one embodiment, the invitation payload itself may indicate that the invitation has expired.

If the accepted invitation remains pending, then in subroutine block 1100, routine 900 attempts to join the invited-to multi-device application session. (See FIG. 11, discussed below.)

If the accepted invitation does not remain pending, then in block 930, routine 900 may automatically generate a "re-invitation" inviting the user who sent the original invitation to join the current user in a new multi-device session of the invited-to application. In block 930, if the user desires, routine 900 may further send a "re-invitation" request to Invitation Server 200 to be processed and passed on to the originally-inviting user according to methods disclosed herein.

Routine 900 ends in block 999.

Figure 10:
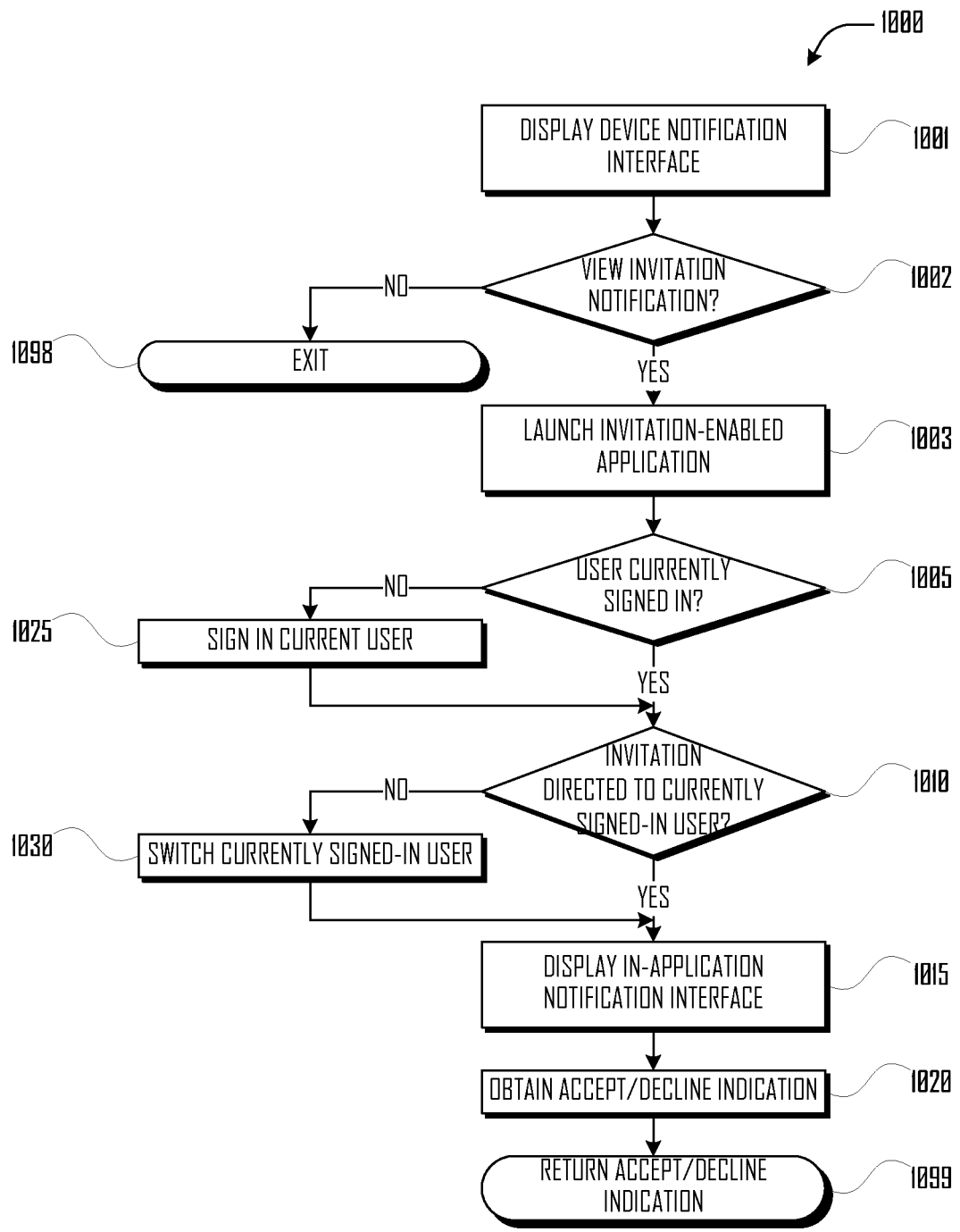
FIG. 10 illustrates a client device notification subroutine in accordance with one embodiment.
Figure 12:
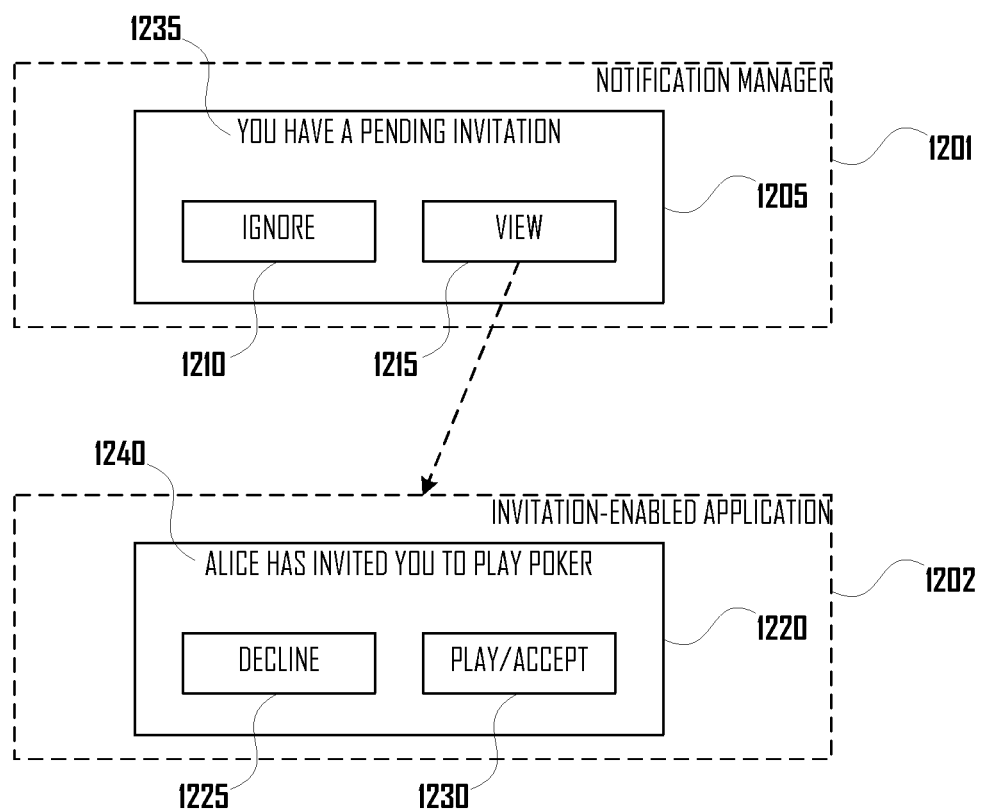
FIG. 12 illustrates a pair of invitation notification interfaces in accordance with one embodiment.

FIG. 10 illustrates a client device notification subroutine 1000 in accordance with one embodiment. In some embodiments, in block 1001, an initial operating-system-managed notification may be displayed to the user. For example, as illustrated in FIG. 12, a non-application-specific notification manager 1201, which may be a standard operating system component in some embodiments, may display an out-of-application initial notification interface 1205.

Referring again to FIG. 10, in decision block 1002, subroutine 1000 determines whether the current device user has indicated to view the invitation notification. If not, in one embodiment, subroutine 1000 may exit completely, as in block 1098, without returning to the calling routine or taking any further action regarding the invitation notification. However, if the current device user has indicated to view the invitation notification, then in block 1003, subroutine 1000 may launch the invitation-enabled application to which the notification is directed.

In some embodiments, the illustrated two-stage notification scheme may be simplified. For example, in one embodiment, the invitation-enabled application to which the notification is directed may already be running, bypassing the initial notification-manager-managed notification interface described herein. In other embodiments, receipt of an invitation notification may be handled entirely by the invitation-enabled application to which the notification is directed, also bypassing the initial notification-manager-managed notification interface described herein. In other embodiments, other notification schemes may be employed without departing from the scope of the present disclosure.

For example, referring again to FIG. 12, in one embodiment, initial notification interface 1205 may include a message 1235, an ignore control 1210, and a view control 1215. In some embodiments, the message 1235 may be determined by the notification manager according to one or more predefined standard notification messages. In other embodiments, message 1235 may be customized according to data included in the received invitation notification. Similarly, in some embodiments, one or both of ignore control 1210 and view control 1215 may have a customized appearance and/or label, determined according to the received invitation notification.

In one embodiment, the ignore control 1210, if activated by the current device user, may silently discard the invitation notification without informing an invitation-enabled application on the device, and without informing the invitation server that sent the notification. In other embodiments, activating the ignore control may inform one or both of an invitation-enabled application on the device and the invitation server that sent the notification. In some embodiments, the view control 1215, when activated by the current device user, may result in the launch of an invitation-enabled application and the subsequent display of an in-application notification, as discussed below.

Referring again to FIG. 10, in decision block 1005, subroutine 1000 determines whether the user currently operating the client device is signed-in to the invitation-enabled application. If not, then in block 1025, subroutine 1000 presents an interface for the user to sign-in.

After the user is signed-in, in decision block 1010, subroutine 1000 determines whether the received invitation notification is directed to the currently signed-in user. If not, then in block 1030, subroutine 1000 may present an interface for to sign-out of the current user account and sign-in as the user to whom the invitation is directed.

After the user to whom the invitation is directed (i.e., the invitee user) is signed-in, in block 1015 subroutine 1000 displays an invitation-enabled-application-managed notification interface. In block 1020, subroutine 1000 obtains an indication to accept or decline the invitation, which is returned to the caller in ending block 1099. In some embodiments, the indication to accept or decline may be obtained via input from the invitee user. In other embodiments, the indication to accept or decline may be determined automatically, according to one or more predetermined rules (which may have been previously established by the invitee user and/or a developer of the invitation-enabled application).

For example, referring again to FIG. 12, in one embodiment, the invitation-enabled application 1202 may manage display of an in-application notification interface 1220. In one embodiment, in-application notification interface 1220 may include a message 1240, a decline control 1225, and an accept control 1230. In some embodiments, the message 1240 may be determined by the invitation-enabled application 1202 according to one or more predefined standard notification messages. In other embodiments, message 1240 (as well as decline control 1225 and/or accept control 1230) may be customized according to data included in the received invitation notification. In some embodiments, one or both of interfaces 1205 and 1220 may also include additional standard or customized controls, graphical elements, and/or sound elements (not shown).

In some embodiments, the decline control 1225, if activated by the current device user, may inform the invitation server that sent the notification that the user has declined the invitation, as discussed above. In some embodiments, the accept control 1230, when activated by the current device user, may cause the invitation-enabled application 1202 to attempt to join the invited-to multi-device application session, as discussed above and below.

Figure 11:
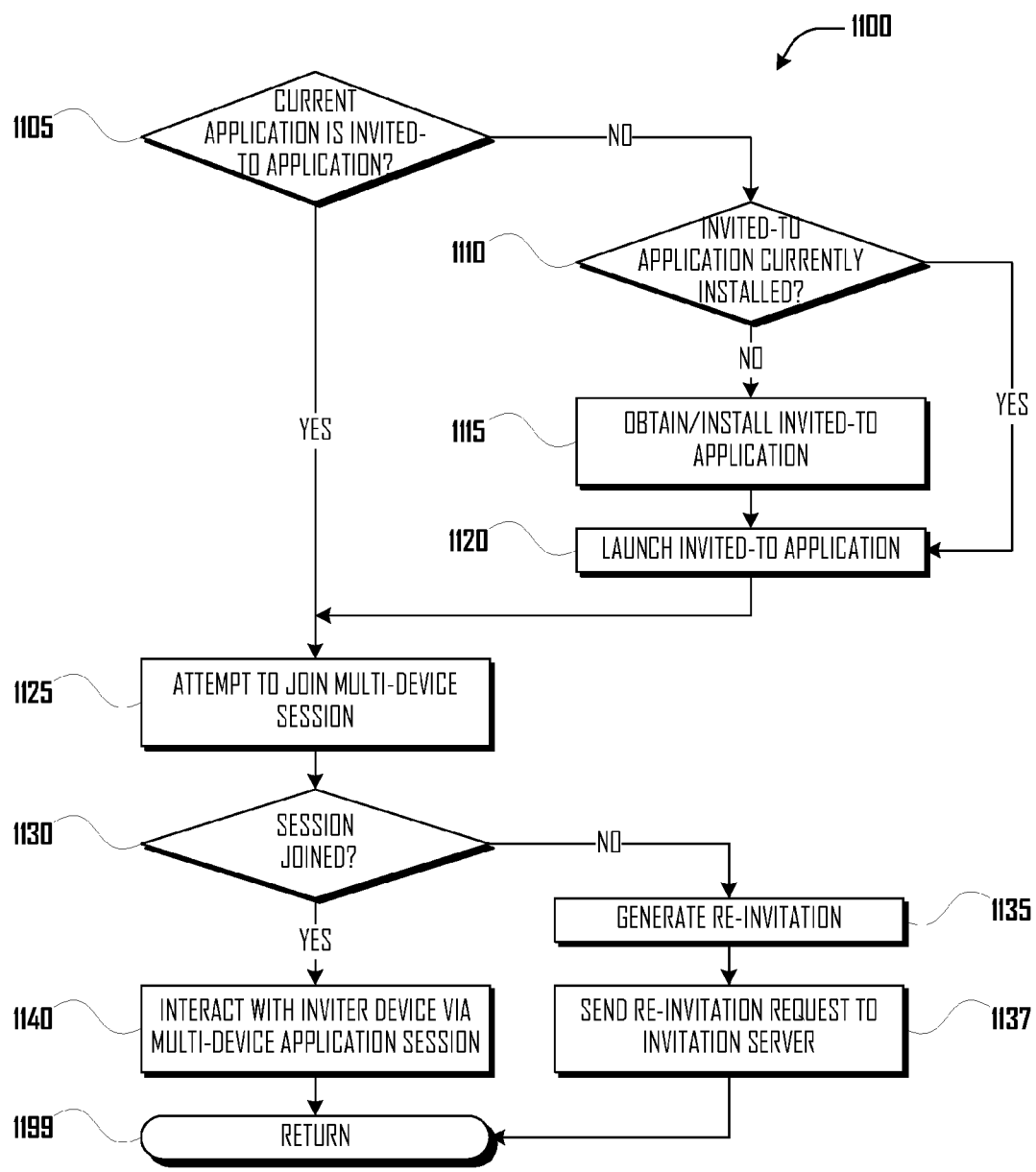
FIG. 11 illustrates a client device multi-device-session joining subroutine in accordance with one embodiment.

FIG. 11 illustrates a multi-device-session joining subroutine 1100, such as may be performed by a client device in accordance with one embodiment. In decision block 1105, subroutine 1100 determines whether the currently-executing invitation-enabled application is the application to which the client device has been invited. For example, if the client device has been invited to join a multi-device session of the application "Poker," then subroutine 1100 determines whether "Poker" is the currently-executing application. If so, then in block 1125, subroutine 1100 attempts to join the invited-to multi-device application session, as discussed below.

However, if in block 1105, subroutine 1100 determines that the currently-executing invitation-enabled application is not the application to which the client device has been invited, then in decision block 1110, subroutine 1100 determines whether the invited-to application is currently installed on the client device. In some embodiments, the currently-executing invitation-enabled application may be able to determine on its own whether the invited-to application is installed, such as by querying the mobile device's operating system and/or inspecting the mobile device's file system.

In other embodiments, however, the currently-executing invitation-enabled application may be executing in a "sandbox," from which it may not be possible to determine the existence or non-existence of other installed applications. In such embodiments, the invitation server that sent the invitation notification and the invitation payload may have determined that the invited-to application is or is not installed on the client device based on the existence or non-existence of "handshake" records, as discussed above. In such embodiments, the invitation server may have included an indication of the installation or non-installation of the invited-to application as part of the invitation notification and/or the invitation payload.

If the invited-to application is not determined to be installed, then in block 1120, subroutine 1100 may launch the invited-to application. However, if the invited-to application is not determined to be installed, then in block 1115, subroutine 1100 causes the invited-to application to be obtained and installed. For example, in some embodiments, the invitation server may have determined and transmitted an application identifier (e.g., an application store URI) that subroutine 1100 can use either to obtain and install the application directly or to initiate a user-directed application purchase and/or download process. For example, in some embodiments, subroutine 1100 may merely direct the user to an application store to purchase, download, and install the invited-to application. If the user declines to obtain the invited-to application (not shown), subroutine 1100 may simply end without returning to its calling routine (not shown).

Once the invited-to invitation-enabled application is running, subroutine 1100 attempts to join the invited-to multi-device application session. For example, subroutine 1100 may use a session identifier (e.g., a session URI) to attempt to contact the inviter client device and establish a connection to an identified application session executing on the inviter device.

In decision block 1130, subroutine 1100 determines whether the attempt to join the invited-to multi-device application session was successful. If the attempt was successful, then in block 1140, subroutine 1100 interacts via network communication with the inviter device until the session ends and subroutine 1100 ends in block 1199.

If, however, the attempt was not successful, then in one embodiment, in block 1135, subroutine 1100 generates a "re-invitation," inviting the original inviter user to join the original invitee user in a new multi-device session of the originally invited-to application. In block 1137, subroutine 1100 sends the re-invitation request to the invitation server. In some embodiments, the re-invitation may be automatically generated and sent. In other embodiments, subroutine 1100 may prompt the user to indicate whether the re-invitation should be generated and/or sent. In some embodiments, subroutine 1100 may also prompt the user to customize various aspects of the re-invitation request, such as a custom message, sound, expiration time, and the like.

Subroutine 1100 ends in block 1199.

Exemplary Use Cases

In various embodiments, an invitation system such as that described herein may be suitable to enable some or all of the following exemplary use cases. Although some of the exemplary use cases are described in terms of multi-player gaming sessions, it will be appreciated that in other embodiments, similar use cases may be extended to non-gaming multi-user, multi-device applications.

In-Game Invites: When a user selects to play multiplayer from an invitation-enabled game's menu, the user may be given choices depending upon the game (e.g., Play with a Friend, Play over Bluetooth, Join a Tournament, and so on). If the user selects "Play with a Friend", the user is shown his or her Friends List. Selecting a Friend on the Friends List will send that Friend an invite to the current game.

Cross-Game Invites: One or more lists of games may be displayed to a user when he or she accesses an invitation-enabled game. Such lists may reflect special promotions, popular applications, top-selling applications, and the like. Selecting one of the listed games may take the user to a Game Information screen having an "Invite Friend" button or control. If the user selects "Invite Friend", then the user is shown his or her Friends List. Selecting a Friend on the Friends List will send that Friend an invite to that game. In this scenario, the sender does not have to own the game in order to invite the receiver.

Using Invites to Join Text/Voice Chat: When viewing a Friends List in an invitation-enabled application, tapping on a Friend will bring up a Text/Voice Chat screen. A text or voice chat session lets two users communicate before deciding which game to play. An invitation notification, such as described herein, may be used to notify the Friend that the user wants to chat. Accepting the Invite will bring the Friend to an appropriate Text/Voice Chat screen within an invitation-enabled application.

Play Together Invites: Once users are in a Text/Voice Chat screen within an invitation-enabled application (above), one of the users can initiate a multi-device game session by selecting "Play Together," which may bring up a list of games to play on the initiator's screen. Selecting a game will launch the game on the initiator's side and send an invite to the other user(s) to join that game session. In this scenario, the sender does NOT have to own the game in order to invite the receiver. If the sender does not own the game, the invitation-enabled application may direct the sender to an application source (e.g., an application store) to buy or otherwise obtain the game. Once the game is installed and launched, the multi-device gaming session play may commence.

Inviting All Friends: A user may have the ability to "Invite All Friends" in some cases. An "Invite All Friends" request may send an invite to each Friend on the user's Friends List as if he or she had manually invited each one. It is up to the game logic to determine the response of how to handle multiple receivers accepting the invite. For example, a chess game may create a separate chess session for each accepting receiver but a trivia game may automatically join all accepting receivers into a single session.

In some cases, an Invite Service may also generate invites to join users who are not on each other's Friends List for different reasons.

"Next Available" Sessions: In some cases, a user may not have any friends currently online but nonetheless wants to be paired with someone to play. In some application ecosystems (as discussed above), relatively few users may be online at a given time. When the user issues a "Next Available" request, the game will check if there are any pending "Open" Invites for a selected game (or family of games, genre of games, and the like) available for the user to join.

If there are Open Invites to a selected game, the user may view profiles of other users who are also waiting to play the selected game and can choose to accept one of the invites and join that multi-device application session. The Invite Service may send a notification to the user who originated the Open Invite to inform him or her that the user wants to play.

If the Open Invites list is empty or the user did not see anyone he or she wants to play with, then the game may create a new Open Invite on behalf of the requesting user and post it into the Open Invites queue. The Open Invite request will be associated by the invite service with the game, family of games, genre of games, and the like that the user is interested in playing. The request may also be limited to a certain group (e.g., certain friends) or a certain class of user (e.g., new players, experienced players, and the like).

Future Events: In some cases, the user can sign up to be invited to future events, such as tournaments, promotional events, and the like. When the time for the event comes, an invite will automatically be sent by the Invite Service to the user. Accepting the invite will connect the user to the event.

Ladder Match: Users can enter ladder matches and can challenge opponents higher up on the ladder. Upon a challenge, the opponent will receive an Invite to the match. If the opponent doesn't accept the challenge or otherwise fails to appear for the match, the match is not recorded and the challenger can choose another opponent from those participating in the ladder match.

Although specific embodiments have been illustrated and described herein, a whole variety of alternate and/or equivalent implementations may be substituted for the specific embodiments shown and described without departing from the scope of the present disclosure. This application is intended to cover any adaptations or variations of the embodiments discussed herein.

The invention claimed is:

1. A client device comprising a processor and a memory storing instructions that, when executed by the processor, perform a method for accepting an invitation to a multi-device networked-application session, the method comprising:

receiving a pushed invitation notification from an invitation server, said pushed invitation notification indicating, via identifiers, at least an invitation from an inviter user for an invitee user to join a multi-device session of a subject networked application, said pushed invitation notification omitting an invitation payload to enable said invitee user to join said multi-device session of said subject networked application;

notifying a user of the client device that said inviter user has invited said invitee user to join said multi-device session;

obtaining an indication from said user of the client device to accept said invitation to join said multi-device session;

sending a response to said invitation server according to said indication, said response identifying said invitation;

authenticating said user of the client device as said invitee user to said invitation server;

in response to authenticating said user of the client device as said invitee user, receiving said invitation payload from said invitation server;

attempting to join said multi-device session according to said invitation payload, but determining that said multi-device session has terminated; and in response to determining that said multi-device session has terminated, automatically generating a re-invitation from said invitee user inviting said inviter user to join a new multi-user session of said networked application.

2. The client device of claim 1, the method further comprising automatically launching said subject networked application prior to attempting to join said multi-device session.

3. The client device of claim 1, wherein notifying said user comprises displaying a first interface comprising an action control, configured to display a second interface, and an ignore control, configured to disregard said invitation without notifying said invitation server; and wherein obtaining said indication from said user of the client device to accept said invitation to join said multi-device session comprises displaying said second interface upon activation of said action control, said second notification comprising an invitation-accept control, configured to indicate acceptance of said invitation, and an invitation-decline control, configured to notify said invitation server that said invitation is declined.

4. The client device of claim 1, the method further comprising automatically obtaining and installing said subject networked application prior to launching said networked application.

5. The client device of claim 4, wherein automatically obtaining and installing said subject networked application comprises automatically initiating a networked-application purchase for completion by said user of the client device.

6. The client device of claim 1, wherein said pushed invitation notification is received via a second networked application, different from said subject networked application.

7. The client device of claim 1, wherein said client device is a mobile device.

8. The client device of claim 1, wherein said multi-device networked-application session comprises a multi-user networked game session.

9. A client device comprising a processor and a memory storing instructions that, when executed by the processor, perform a method for accepting an invitation to a multi-device networked-application session, the method comprising:

receiving a pushed invitation notification from an invitation server, said pushed invitation notification indicating, via identifiers, at least an invitation from an inviter user for an invitee user to join a multi-device session of a subject networked application, said pushed invitation notification omitting an invitation payload to enable said invitee user to join said multi-device session of said subject networked application;

notifying a user of the client device that said inviter user has invited said invitee user to join said multi-device session;

obtaining an indication from said user of the client device to accept said invitation to join said multi-device session;

sending a response to said invitation server according to said indication, said response identifying said invitation;

determining that said user of the client device is signed-in to a user account that does not correspond to said invitee user; and displaying an interface to facilitate signing-in to a user account corresponding to said invitee user; and then authenticating said user of the client device as said invitee user to said invitation server;

in response to authenticating said user of the client device as said invitee user, receiving said invitation payload from said invitation server; and attempting to join said multi-device session according to said invitation payload.

10. The client device of claim 9, the method further comprising automatically launching said subject networked application prior to attempting to join said multi-device session.

11. The client device of claim 9, wherein notifying said user comprises displaying a first interface comprising an action control, configured to display a second interface, and an ignore control, configured to disregard said invitation without notifying said invitation server; and wherein obtaining said indication from said user of the client device to accept said invitation to join said multi-device session comprises displaying said second interface upon activation of said action control, said second notification comprising an invitation-accept control, configured to indicate acceptance of said invitation, and an invitation-decline control, configured to notify said invitation server that said invitation is declined.

12. The client device of claim 9, the method further comprising automatically obtaining and installing said subject networked application prior to launching said networked application.

13. The client device of claim 12, wherein automatically obtaining and installing said subject networked application comprises automatically initiating a networked-application purchase for completion by said user of the client device.

14. The client device of claim 9, the method further comprising:

determining that said multi-device session has terminated; and in response to determining that said multi-device session has terminated, automatically generating a re-invitation from said invitee user inviting said inviter user to join a new multi-user session of said networked application.

15. The client device of claim 9, wherein said pushed invitation notification is received via a second networked application, different from said subject networked application.

16. The client device of claim 9, wherein said client device is a mobile device.

17. The client device of claim 9, wherein said multi-device networked-application session comprises a multi-user networked game session.

18. A non-transient computer-readable storage medium having stored thereon instructions that, when executed by a processor, perform a method for accepting an invitation to a multi-device networked-application session, the method comprising:
- receiving a pushed invitation notification from an invitation server, said pushed invitation notification indicating, via identifiers, at least an invitation from an inviter user for an invitee user to join a multi-device session of a subject networked application, said pushed invitation notification omitting an invitation payload to enable said invitee user to join said multi-device session of said subject networked application;
- notifying a user of the client device that said inviter user has invited said invitee user to join said multi-device session;
- obtaining an indication from said user of the client device to accept said invitation to join said multi-device session;
- sending a response to said invitation server according to said indication, said response identifying said invitation;
- authenticating said user of the client device as said invitee user to said invitation server;
- in response to authenticating said user of the client device as said invitee user, receiving said invitation payload from said invitation server;
- attempting to join said multi-device session according to said invitation payload, but determining that said multi-device session has terminated; and
- in response to determining that said multi-device session has terminated, automatically generating a re-invitation from said invitee user inviting said inviter user to join a new multi-user session of said networked application.

19. A client-device-implemented method for accepting an invitation to a multi-device networked-application session, the method comprising:
- receiving, by the client device, a pushed invitation notification from an invitation server, said pushed invitation notification indicating, via identifiers, at least an invitation from an inviter user for an invitee user to join a multi-device session of a subject networked application, said pushed invitation notification omitting an invitation payload to enable said invitee user to join said multi-device session of said subject networked application;
- notifying, by the client device, a user of the client device that said inviter user has invited said invitee user to join said multi-device session;
- obtaining, by the client device, an indication from said user of the client device to accept said invitation to join said multi-device session;
- sending, by the client device, a response to said invitation server according to said indication, said response identifying said invitation;
- authenticating, by the client device, said user of the client device as said invitee user to said invitation server;
- in response to authenticating said user of the client device as said invitee user, receiving said invitation payload from said invitation server;
- attempting, by the client device, to join said multi-device session according to said invitation payload, but determining that said multi-device session has terminated; and
- in response to determining that said multi-device session has terminated, automatically generating, by the client device, a re-invitation from said invitee user inviting said inviter user to join a new multi-user session of said networked application.

20. The method of claim 19, further comprising automatically launching said subject networked application prior to attempting to join said multi-device session.

21. The method of claim 19, wherein notifying said user comprises displaying a first interface comprising an action control, configured to display a second interface, and an ignore control, configured to disregard said invitation without notifying said invitation server; and
- wherein obtaining said indication from said user of the client device to accept said invitation to join said multi-device session comprises displaying said second interface upon activation of said action control, said second notification comprising an invitation-accept control, configured to indicate acceptance of said invitation, and an invitation-decline control, configured to notify said invitation server that said invitation is declined.

22. The method of claim 19, further comprising automatically obtaining and installing said subject networked application prior to launching said networked application.

23. The method of claim 22, wherein automatically obtaining and installing said subject networked application comprises automatically initiating a networked-application purchase for completion by said user of the client device.

24. The method of claim 19, wherein said pushed invitation notification is received via a second networked application, different from said subject networked application.

25. The method of claim 19, wherein said client device is a mobile device.

26. The method of claim 19, wherein said multi-device networked-application session comprises a multi-user networked game session.

27. A non-transient computer-readable storage medium having stored thereon instructions that, when executed by a processor, perform a method for accepting an invitation to a multi-device networked-application session, the method comprising:
- receiving a pushed invitation notification from an invitation server, said pushed invitation notification indicating, via identifiers, at least an invitation from an inviter user for an invitee user to join a multi-device session of a subject networked application, said pushed invitation notification omitting an invitation payload to enable said invitee user to join said multi-device session of said subject networked application;
- notifying a user of the client device that said inviter user has invited said invitee user to join said multi-device session;
- obtaining an indication from said user of the client device to accept said invitation to join said multi-device session;
- sending a response to said invitation server according to said indication, said response identifying said invitation;
- determining that said user of the client device is signed-in to a user account that does not correspond to said invitee user; and
- displaying an interface to facilitate signing-in to a user account corresponding to said invitee user; and then
- authenticating said user of the client device as said invitee user to said invitation server;
- in response to authenticating said user of the client device as said invitee user, receiving said invitation payload from said invitation server; and
- attempting to join said multi-device session according to said invitation payload.

28. A client-device-implemented method for accepting an invitation to a multi-device networked-application session, the method comprising:

receiving, by the client device, a pushed invitation notification from an invitation server, said pushed invitation notification indicating, via identifiers, at least an invitation from an inviter user for an invitee user to join a multi-device session of a subject networked application, said pushed invitation notification omitting an invitation payload to enable said invitee user to join said multi-device session of said subject networked application;

notifying, by the client device, a user of the client device that said inviter user has invited said invitee user to join said multi-device session;

obtaining, by the client device, an indication from said user of the client device to accept said invitation to join said multi-device session;

sending, by the client device, a response to said invitation server according to said indication, said response identifying said invitation;

determining, by the client device, that said user of the client device is signed-in to a user account that does not correspond to said invitee user; and displaying, by the client device, an interface to facilitate signing-in to a user account corresponding to said invitee user; and then authenticating, by the client device, said user of the client device as said invitee user to said invitation server;

in response to authenticating said user of the client device as said invitee user, receiving said invitation payload from said invitation server; and attempting, by the client device, to join said multi-device session according to said invitation payload.

29. The method of claim 28, further comprising automatically launching said subject networked application prior to attempting to join said multi-device session.

30. The method of claim 28, wherein notifying said user comprises displaying a first interface comprising an action control, configured to display a second interface, and an ignore control, configured to disregard said invitation without notifying said invitation server; and wherein obtaining said indication from said user of the client device to accept said invitation to join said multi-device session comprises displaying said second interface upon activation of said action control, said second notification comprising an invitation-accept control, configured to indicate acceptance of said invitation, and an invitation-decline control, configured to notify said invitation server that said invitation is declined.

31. The method of claim 28, further comprising automatically obtaining and installing said subject networked application prior to launching said networked application.

32. The method of claim 31, wherein automatically obtaining and installing said subject networked application comprises automatically initiating a networked-application purchase for completion by said user of the client device.

33. The method of claim 28, further comprising:
determining that said multi-device session has terminated; and
in response to determining that said multi-device session has terminated, automatically generating a re-invitation from said invitee user inviting said inviter user to join a new multi-user session of said networked application.

34. The method of claim 28, wherein said pushed invitation notification is received via a second networked application, different from said subject networked application.

35. The method of claim 28, wherein said client device is a mobile device.

36. The method of claim 28, wherein said multi-device networked-application session comprises a multi-user networked game session.

\* \* \* \* \*